(12) United States Patent
Cui et al.

(10) Patent No.: US 12,167,261 B2
(45) Date of Patent: Dec. 10, 2024

(54) CARRIER SPECIFIC SCALING FACTOR WITHOUT MEASUREMENT GAP FOR MEASUREMENTS IN DUAL CONNECTIVITY

(71) Applicant: Apple Inc., Cupertino, CA (US)

(72) Inventors: Jie Cui, San Jose (CA); Yushu Zhang, Beijing (CN); Yang Tang, San Jose, CA (US); Dawei Zhang, Saratoga, CA (US); Hong He, San Jose, CA (US); Manasa Raghavan, Sunnyvale, CA (US); Huaning Niu, San Jose, CA (US); Haitong Sun, Cupertino, CA (US); Weidong Yang, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 17/442,557

(22) PCT Filed: Oct. 22, 2020

(86) PCT No.: PCT/CN2020/122894
§ 371 (c)(1),
(2) Date: Sep. 23, 2021

(87) PCT Pub. No.: WO2022/082630
PCT Pub. Date: Apr. 28, 2022

(65) Prior Publication Data
US 2022/0312234 A1 Sep. 29, 2022

(51) Int. Cl.
*H04W 24/08* (2009.01)
*H04W 24/10* (2009.01)
*H04W 76/15* (2018.01)

(52) U.S. Cl.
CPC .......... *H04W 24/08* (2013.01); *H04W 24/10* (2013.01); *H04W 76/15* (2018.02)

(58) Field of Classification Search
CPC ............. H04W 76/15; H04W 36/0058; H04W 36/0069; H04W 48/16; H04B 17/318
See application file for complete search history.

(56) References Cited

U.S. PATENT DOCUMENTS

| | | | |
|---|---|---|---|
| 2019/0274146 A1 | 9/2019 | Tang et al. | |
| 2019/0306734 A1* | 10/2019 | Huang | H04W 24/08 |

(Continued)

FOREIGN PATENT DOCUMENTS

| | | |
|---|---|---|
| CN | 106797289 A | 5/2017 |
| CN | 111148146 A | 5/2020 |

(Continued)

OTHER PUBLICATIONS

Ericsson; "Scaling for measurements of multiple frequency layers with gaps"; Agenda item: 9.7.4.3 3GPP TSG-RAN WG4 Meeting #85 Reno, USA, Nov. 27-Dec. 1, 2017 R4-1712486 (Year: 2017).*

(Continued)

*Primary Examiner* — Gary Mui
(74) *Attorney, Agent, or Firm* — Kilpatrick Townsend & Stockton LLP

(57) ABSTRACT

The present application relates to devices and components including apparatus, systems, and methods for carrier-specific scaling factor for measurements without measurement gaps in dual connectivity networks.

22 Claims, 11 Drawing Sheets

(56) References Cited

U.S. PATENT DOCUMENTS

| | | | | |
|---|---|---|---|---|
| 2019/0364469 | A1* | 11/2019 | Siomina | H04W 36/30 |
| 2022/0046444 | A1* | 2/2022 | Manolakos | H04L 5/0091 |
| 2022/0217562 | A1* | 7/2022 | Tang | H04W 24/10 |
| 2023/0023237 | A1* | 1/2023 | Han | H04W 24/10 |
| 2023/0030224 | A1* | 2/2023 | Wang | H04W 24/08 |

FOREIGN PATENT DOCUMENTS

| | | |
|---|---|---|
| WO | 2019215901 A1 | 11/2019 |
| WO | 2020088597 | 5/2020 |

OTHER PUBLICATIONS

Samsung; "Scaling Factor for Measurement on Multiple Frequency Layers"; Agenda item: 4.6.5.3 3GPP TSG-RAN WG4 Meeting AH-1801 San Diego, Califonia, USA, Jan. 22-26, 2018 R4-1800202 (Year: 2018).*

Ericsson; "Carrier specific scaling factor for gap-based measurements with multiple measurement objects"; Agenda item: 7.11.3.3 3GPP TSG-RAN WG4 Meeting #88bis Chengdu, China, Oct. 8-12, 2018 R4-1812096 (Year: 2018).*

Huawei, HiSilicon; "Discussion on the scaling factor CSSF for multiple SCells"; Agenda item: 7.11.3.2.1 3GPP TSG-RAN WG4 Meeting #89 Spokane, USA, Nov. 12-16, 2018 R4-1815530 (Year: 2018).*

Ericsson; "CSSF outside gap for NR-DC operation"; Agenda item: 6.4.3 3GPP TSG-RAN WG4 Meeting #90 Athens, Greece, Feb. 25-Mar. 1, 2019 R4-1900944 (Year: 2019).*

International Patent Application No. PCT/CN2020/122894, International Preliminary Report on Patentability, dated May 4, 2023, 7 pages.

Consideration on Issues for Inter-Frequency Measurement Without Gap, 3GPP TSG-RAN WG4 Meeting #94-e-Bis Electronic Meeting, R4-2003381, Apr. 20-30, 2020, 5 pages.

CR On Introducing Inter-Frequency Measurement Without Measurement Gap, 3GPP TSG-RAN WG4 Meeting #95-e , Electronic Meeting, R4-2006807, May 25-Jun. 5, 2020, 17 pages.

International Patent Application No. PCT/CN2020/122894, International Search Report and Written Opinion, dated Jul. 15, 2021, 10 pages.

Further discussion on CSSF for R15 EN-DC, Apple Inc., 3GPP TSG RAN4 Meeting #98e, R4-2100172, Jan. 25-Feb. 5, 2021, 7 pages.

3rd Generation Partnership Project; Technical Specification Group Radio Access Network; Evolved Universal Terrestrial Radio Access (E-UTRA) and NR; Multi-connectivity; Stage 2 (Release 16), 3GPP TS 37.340 V16.3.0, Sep. 2020, 83 pages.

3rd Generation Partnership Project; Technical Specification Group Radio Access Network; NR; User Equipment (UE) radio transmission and reception; Part 2: Range 2 Standalone (Release 16), 3GPP TS 38.101-2 V16.5.0, Sep. 2020, 181 pages.

3rd Generation Partnership Project; Technical Specification Group Radio Access Network; NR; Requirements for support of radio resource management (Release 16), 3GPP TS 38.133 V16.5.0, Sep. 2020, 1608 pages.

3 Generation Partnership Project Technical Specification 38.133, V16.5.0, 3rd Generation Partnership Project; Technical Specification Group Radio Access Network; NR; Requirements for Support of Radio Resource Management (Release 16), vol. RAN WG4, No. V16.5.0, Oct. 9, 2020, pp. 39-407.

CR on MRTD for FR2 Inter-Band CA, 3rd Generation Partnership Project (3GPP), Apple Inc., R4-2012181, Aug. 17-18, 2020, 16 pages.

Discussion on new measurement gap patterns for positioning measurements, 3 Generation Partnership Project Radio Access Network Working Group 4 Meeting #96-e, R4-2009849, Aug. 17-28, 2020, 3 pages.

Motivation for Further RRM Enhancement in Rel-17, Huawei, 3 Generation Partnership Project Technical Specification Group Radio Access Network Meeting #88e, RP-201031, Jun. 29-Jul. 3, 2020, 4 pages.

China Patent Application No. 202080106429.2, Office Action, Jun. 27, 2024, 8 pages.

European Patent Application No. 20958212.1, Extended European Search Report, Sep. 17, 2024, 16 pages.

European Patent Application No. 20958212.1, Partial Supplementary European Search Report, Jun. 25, 2024, 17 pages.

* cited by examiner

| Scenario | $CSSF_{outside\_gap,i}$ for FR1 PSCC | $CSSF_{outside\_gap,i}$ for FR1 SCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-RAT NR measurement on SCCs |
|---|---|---|---|---|---|---|
| EN-DC w/ FR1 only CA | '1' when only intra-frequency NR MO or only inter-RAT NR MO is configured on this PSCC; '2' when both intra-frequency NR MO and inter-RAT NR MO are configured on this PSCC | Number of configured FR1 SCell(s)+number of inter-RAT NR measurement on SCCs | N/A | N/A | N/A | Number of configured FR1 SCell(s)+number of inter-RAT NR measurement SCCs |

Figure 3

| Scenario | $CSSF_{outside\_gap,i}$ for FR1 PSCC | $CSSF_{outside\_gap,i}$ for FR1 SCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-RAT NR measurement on SCCs |
|---|---|---|---|---|---|---|
| EN-DC w/ FR2 only intra band CA | N/A | N/A | '1' when only intra-frequency NR MO or only inter-RAT NR MO is configured on this PSCC; '2' when both intra-frequency NR MO and inter-RAT NR MO are configured on this PSCC | N/A | Number of configured FR2 SCell(s)+number of inter-RAT NR measurement on SCCs | Number of configured FR2 SCell(s)+number of inter-RAT NR measurement on SCCs |

| Scenario | $CSSF_{outside\_gap,i}$ for FR1 PSCC | $CSSF_{outside\_gap,i}$ for FR1 SCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-RAT NR measurement on SCCs |
|---|---|---|---|---|---|---|
| EN-DC w/ FR1+FR2 CA (FR1 PSCell) | '1' when only intra-frequency NR MO or only inter-RAT NR MO is configured on this PSCC; '2' when both intra-frequency NR MO and inter-RAT NR MO are configured on this PSCC | 2x(Number of configured SCell(s)+number of inter-RAT NR measurement on SCCs-1) if $CSSF_{outside\_gap,i}=2$ for FR2 SCC where neighbor cell measurement is required; 2x(Number of configured SCell(s)+number of inter-RAT NR measurement on SCCs-2) if $CSSF_{outside\_gap,i}=4$ for FR2 SCC where neighbor cell measurement is required | N/A | '2' when only intra-frequency NR MO or only inter-RAT NR MO is configured on this SCC; '4' when both intra-frequency NR MO and inter-RAT NR MO are configured on this SCC | 2x(Number of configured SCell(s)+number of inter-RAT NR measurement on SCCs-1) if $CSSF_{outside\_gap,i}=2$ for FR2SCC where neighbor cell measurement is required; 2x(Number of configured SCell(s)+number of inter-RAT NR measurement on SCCs-2) if $CSSF_{outside\_gap,i}=4$ for FR2 SCC where neighbor cell measurement is required | 2x(Number of configured SCell(s)+number of inter-RAT NR measurement on SCCs-1) if $CSSF_{outside\_gap,i}=2$ for FR2SCC where neighbor cell measurement is required; 2x(Number of configured SCell(s)+number of inter-RAT NR measurement on SCCs-2) if $CSSF_{outside\_gap,i}=4$ for FR2 SCC where neighbor cell measurement is required |

Figure 5

| Scenario | $CSSF_{outside\_gap,i}$ for FR1 PSCC | $CSSF_{outside\_gap,i}$ for FR1 SCC | $CSSF_{outside\_gap,i}$ for FR2 PSCC | $CSSF_{outside\_gap,i}$ for FR2 SCC where neighbor cell measurement is required | $CSSF_{outside\_gap,i}$ for FR2 SCC where neighbor cell measurement is not required | $CSSF_{outside\_gap,i}$ for inter-RAT NR measurement on SCCs |
|---|---|---|---|---|---|---|
| EN-DC w/ FR1+FR2 CA (FR2 PSCell) | N/A | Number of configured SCell(s)+number of inter-RAT NR measurement on SCCs | '1' when only intra-frequency NR MO or only inter-RAT NR MO is configured on this PSCC; '2' when both intra-frequency NR MO and inter-RAT NR MO are configured on this PSCC | N/A | Number of configured SCells(s)+number of inter-RAT NR measurement on SCCs | Number of configured SCell(s)+number of inter-RAT NR measurement on SCCs |

Figure 6

CARRIER SPECIFIC SCALING FACTOR WITHOUT MEASUREMENT GAP FOR MEASUREMENTS IN DUAL CONNECTIVITY

CROSS REFERENCES TO RELATED APPLICATIONS

This application is the U.S. National Phase of PCT Application No. PCT/CN2020/122894, filed Oct. 22, 2020, the disclosure of which is incorporated by reference in its entirety.

BACKGROUND

Third Generation Partnership Project (3GPP) Technical Specifications (TSs) define standards for wireless networks. These TSs includes numerous details relating to dual connectivity (DC) operation in which a user equipment may be provided radio resources from a plurality of base stations.

BRIEF DESCRIPTION OF THE DRAWINGS

FIG. 3 illustrates a table describing carrier-specific scaling factor (CSSF) calculations in accordance with some embodiments.

FIG. 4 illustrates another table describing CSSF calculations in accordance with some embodiments.

FIG. 5 illustrates another table describing CSSF calculations in accordance with some embodiments.

FIG. 6 illustrates another table describing CSSF calculations in accordance with some embodiments.

DETAILED DESCRIPTION

Figure 1:
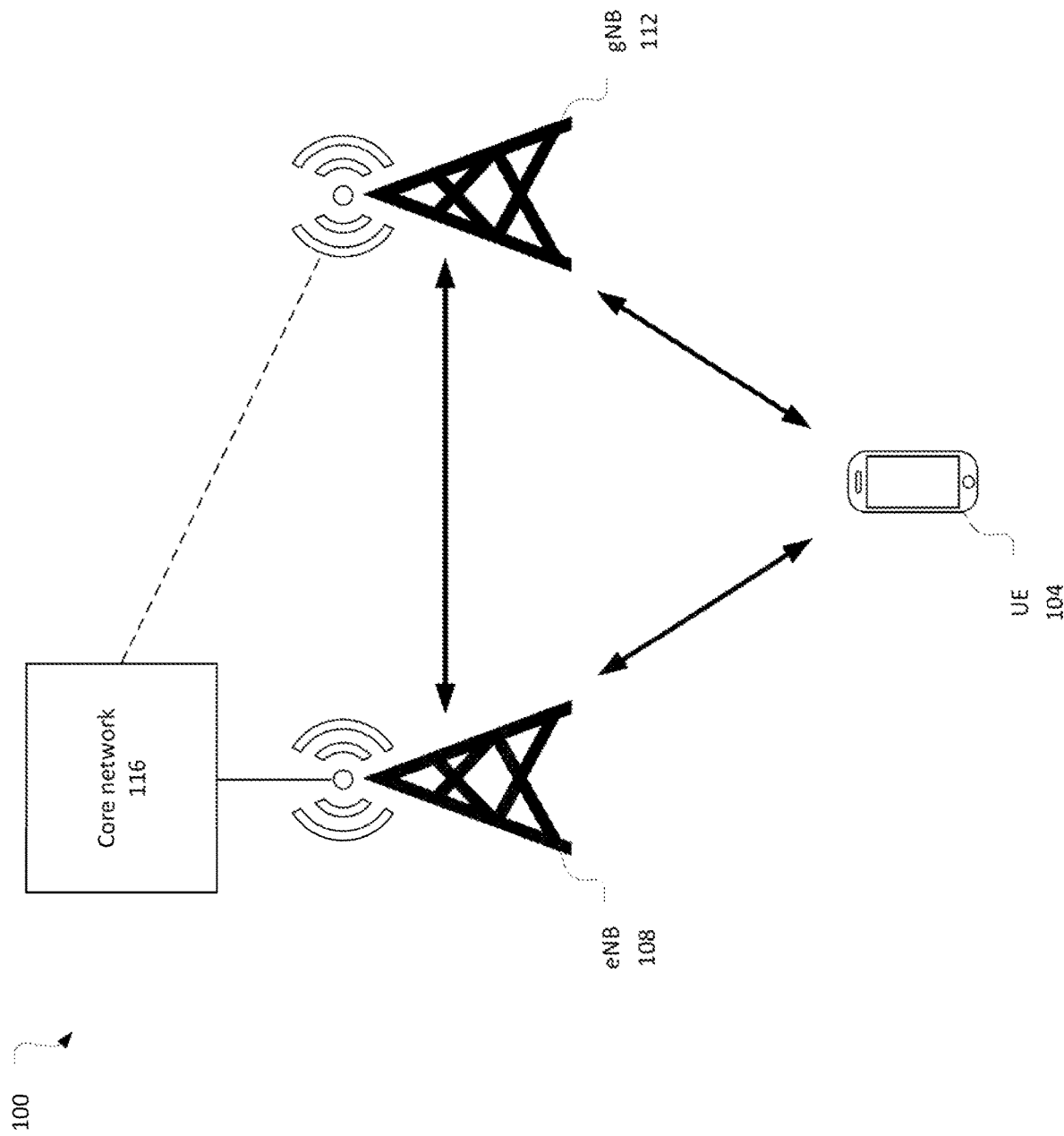
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base station such as, for example, an evolved node B (eNB) 108 and a gNB 112. The UE 104 and the base stations may communicate over air interfaces compatible with 3GPP TSs such as those that define Long Term Evolution (LTE) and Fifth Generation (5G) new radio (NR) system standards. The eNB 108 may provide one or more LTE evolved universal terrestrial radio access (E-UTRA) cells to provide E-UTRA user plane and control plane protocol terminations toward the UE 104. The gNB 112 may provide one or more 5G NR cells to provide NR user plane and control plane protocol terminations toward the UE 104.

The network environment 100 may support dual connectivity (DC) operation in which the UE 104 may be configured to utilize radio resources provided by distinct schedulers located in the eNB 108 and the gNB 112. Given that the eNB 108 and the gNB 112 provide serving cells with different radio access technologies (RATs), the DC operation may also be referred to as multi-RAT DC or multi-radio DC (MR DC). The base stations may be coupled with each other via an X2 interface over an ideal or non-ideal backhaul.

One of the base stations may be configured as a master node (MN) to provide a control plane connection to the core network 116. The MN may be associated with the group of serving cells referred to as a master cell group (MCG), which includes a primary cell (SpCell) and optionally one or more secondary cells (SCells) in a carrier aggregation (CA) deployment. The SpCell of the MCG may also be referred to as a PCell.

The other base station may be configured as a secondary node (SN), which may not have a control plane connection to the core network 116. The SN may be used to provide additional resources to the UE 104. The SN may be associated with a group of serving cells referred to as a secondary cell group (SCG), which includes an SpCell and one or more SCells in a CA deployment. The SpCell of the SCG may also be referred to as a PScell.

Embodiments described herein include the eNB 108 operating as the MN and the gNB 112 operating as the SN. This may be referred to as E-UTRA-NR (EN) DC. In this context, the eNB 108 may also be referred to as MN eNB 108 and the gNB may be referred to as the SN gNB 112.

The cells of the MCG and SCG may be in a frequency range 1 (FR1), corresponding to frequency range 410 MHz-7125 MHz or frequency range 2 (FR2) corresponding to frequency range 24,250 MHz-52,600 MHz.

At least the MN (for example, the eNB 108) may be coupled with the core network 116 via an S1 interface. In some embodiments, the SN (for example, the gNB 112) may also be coupled with the core network 116. In some embodiments, the core network 116 may be an evolved packet core (EPC), in which case the gNB 112 may be referred to as an en-gNB. In other embodiments, the core network 116 may be a 5G core network (5GC), in which case the eNB 108 may be a ng-eNB.

The base stations may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The UE 104 may include two MAC entities to enable communication with the MCG and SCG.

In some embodiments, the MN eNB 108 and the SN gNB 112 may configure measurement objects (MOs) to the UE 104. An MO may identify time and frequency location of synchronization signal/physical broadcast channel blocks (SSBs) and channel state information-reference signal (CSI-RS) resources to be measured.

In some embodiments both the base stations may configure the UE 104 with NR MOs, for example, MOs that identify SSBs/CSI-RS resources within the NR cells. These MOs may include intra-RAT MOs and inter-RAT MOs. An intra-RAT MO may configure intra-RAT measurements, which may include inter-frequency and intra-frequency measurements. The SN gNB 112 may provide the UE 104 with an intra-RAT MO to configure the UE 104 to measure an NR frequency layer. An inter-RAT MO may configure inter-RAT measurements. For example, the MN eNB 108 may provide the UE 104 with an inter-RAT MO to configure the UE 104 to measure the NR frequency layer.

In some embodiments, the UE 104 may use a CSSF to scale measurement delay requirements and NR positioning reference signal (PRS)-based measurements when the UE 104 is configured to monitor multiple MOs. A $CSSF_{outside\text{-}gap,j}$ may be the scaling factor for measurements of measurement object i conducted outside measurement gaps. A $CSSF_{outside\text{-}gap,i}$ may be applied to intra-frequency and inter-frequency measurements with no measurement gaps.

In some embodiments, the UE 104 may be configured with inter-RAT MOs (from PCell of the MN eNB 108) and intra-frequency MOs (from PScell of the SN gNB) for the same NR serving component carrier. Typically, the UE 104 may assume that only one MO is to be configured on the NR frequency layer of the PSCell. Thus, when two MOs are configured, and they include some different parameters, the UE 104 may need to determine whether to treat them as the same or different. This may influence the calculation of the CSSF and, therefore, the measurement period for performing the resulting measurements.

An MO merging rule is provided in 3GPP TS 38.133 v16.5.0 (2020-09) for determining a number of layers the UE 104 is capable of monitoring. In particular, it is provided that "When the E-UTRA PCell and PSCell configures the same NR carrier frequency layer to be monitored by the UE in synchronous intra-band EN-DC, this layer shall be counted only once to the total number of effective carrier frequency layers provided that the SFN-s and slot boundaries are aligned, unless the configured NR carrier frequency layers to be monitored have—different RSSI measurement resources or—different deriveSSM-IndexFromCell indications or—different [SSB-based measurement timing] configurations." 3GPP TS 38.133, Section 9.1.3.2.

The deriveSSB-IndexFromCell indication may provide the UE 104 with information about frame boundary alignment. For example, when this indication is enabled, the UE 104 may assume half frame, subframe, and slot boundary alignment across cells on a same frequency carrier is within a predetermined tolerance and SFNs of all cells on the same frequency carrier are the same.

In some embodiments, when the MO merging rule is met, the UE 104 may merge the inter-RAT MO and intra-frequency MO and only count '1' in the CSSF design. However, if the MO merging rule is not met, in some cases the UE 104 may still only need to count '1' in the CSSF design. For example, if an SSB-based measurement timing configuration (SMTC) configuration between the inter-RAT MO and the intra-frequency MO are not overlapped on time domain (for example, they are time-division multiplexed (TDMed)); or a received signal strength indicator (RSSI) measurement resource between the inter-RAT MO and the intra-frequency MO are not overlapped on time domain (for example, they are TDMed). In some instances, the TDM nature of these different parameters may enable the MOs to be combined for purposes of the CSSF calculation as described in further detail herein.

Figure 2:
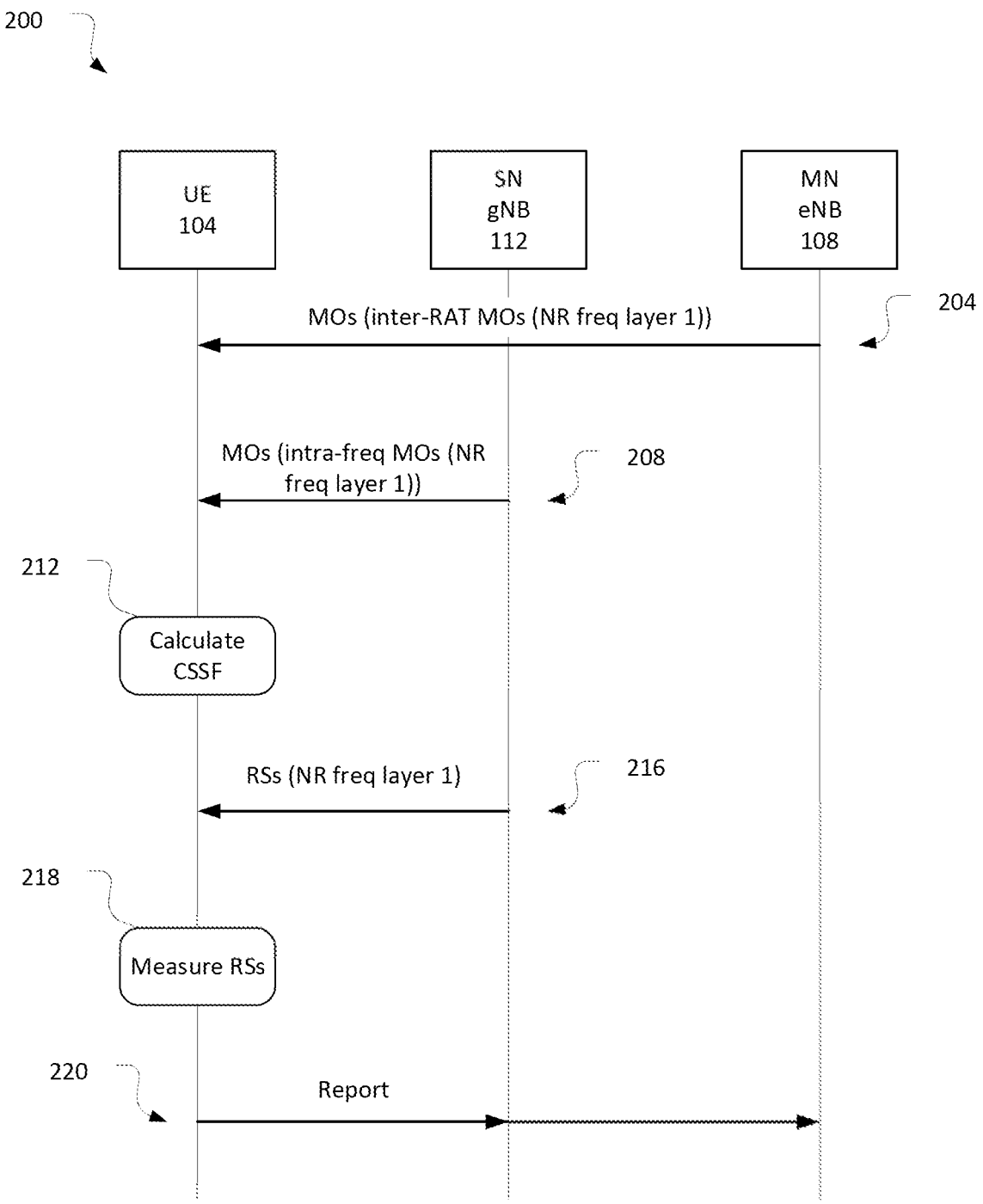
FIG. 2 illustrates a measurement procedure in accordance with some embodiments.

FIG. 2 illustrates a measurement operation 200 in accordance with some embodiments.

The measurement operation 200 may include, at 204, the MN eNB 108 providing MOs to configure the UE 104 to measure various component carriers. The component carriers may include both a primary component carrier (PCC) that provides the PCell, one or more secondary component carriers (SCCs) that provide respective SCells; a primary secondary component carrier (PSCC) that provides a PSCell; and one or more SCCs that provide respective SCells. In some embodiments, the MOs may include an inter-RAT MO that configures the UE 104 to measure an NR frequency layer, for example, NR frequency layer 1.

The measurement operation 200 may further include, at 208, the SN gNB 112 providing MOs to configure the UE 104 to measure various component carriers. The component carriers may include the PSCC and one or more SCCs that provide respective SScells. In some embodiments, the MOs may include an intra-frequency MO to configure the UE 104 to measure the same NR frequency layer as the inter-RAT MO, for example, NR frequency layer 1.

At 212, the UE 104 may calculate a CSSF to use for measurements configured by the MOs outside measurement gap. Three options are described to calculate the CSSF in various embodiments.

In a first option, the UE 104 may calculate the CSSF by counting the inter-RAT MO and intra-frequency MO independent on same serving carrier regardless of whether the MO merging rule is met.

In a second option, the UE may calculate the CSSF by counting the inter-RAT MO and intra-frequency MO independent on same serving carrier only when MO merging rule cannot be met. In some special cases, even though the MO merging rule cannot be met, the UE 104 may still count the inter-RAT MO and intra-frequency MO as a single MO in the CSSF calculation.

In a third option, the UE 104 may calculate the CSSF by only counting the intra-frequency MO or only counting the inter-RAT MO. This may imply that the MN eNB 108 avoids configuring NR inter-RAT MO in EN-DC case; or the SN avoids configuring the NR intra-RAT MO in EN-DC case.

These and further options will be described in further detail as follows.

At 216, the SN gNB 112 may transmit reference signals on various component carriers including, for example, a carrier of the NR frequency layer 1. These reference signals may be SSB or CSI-RS.

The measurement operation 200 may further include, at 218, the UE 104 measuring the RSs transmitted by the SN gNB 112. The measurements may be outside of measurement gaps as configured by the MOs received from the MN eNB 108 and the SN gNB 112. The measurements may be conducted within a measurement period determined based on the calculated CSSF.

In some embodiments, the UE 104 may include a plurality of searchers that are capable of simultaneously measuring a corresponding plurality of component carriers. The searchers may correspond to radio-frequency and baseband processing resources that may be used for the measurement operations. In some embodiments, the UE 104 may include two searchers. A first searcher may be dedicated to performing measurements on an SpCell (for example, a PCell or PSCell) while a second searcher may be dedicated to performing measurements on one or more SCells. The UE 104 may calculate a plurality of CSSFs that may be used to facilitate sharing of the searchers among the different primary and secondary component carriers.

At 220, the UE 104 may send a report to the network based on the measurement of the RSs. The report may be sent to the MN eNB 108 or the SN gNB 112. The report may be periodic, aperiodic, or event-based.

As briefly introduced above, the first option for calculating the CSSF is that both the inter-RAT MO and the intra-frequency MO on a same serving cell are counted independently regardless of whether the MO merging rule is met. Thus, the UE 104 may calculate the CSSF outside measurement gap by independently counting the inter-RAT MO configured from the LTE PCell (for example, by MN eNB 108) and intra-frequency MO configured from NR PScell (for example, by SN gNB 112) no matter whether they are on the same frequency layer.

FIGS. 3-6 illustrate tables describing CSSF calculations for EN-DC with various scenarios. The CSSFs may include a $CSSF_{outside\_gap,i}$ for FR1 PSCC; a $CSSF_{outside\_gap,i}$ for FR1 SCC; a $CSSF_{outside\_gap,i}$ for FR2 PSCC; a $CSSF_{outside\_gap,i}$ for FR2 SCC where neighbor cell measurement is required; a $CSSF_{outside\_gap,i}$ for FR2 SCC where neighbor cell measurement is not required; and a $CSSF_{outside\_gap,i}$ for inter-RAT NR measurements on SCCs. These CSSFs will be described in further detail below upon their subsequent introduction.

FIG. 3 illustrates a table 300 describing CSSF calculations for a scenario in accordance with some embodiments. In this embodiment, the CSSF calculations may be for an EN-DC with FR1-only CA scenario. In this scenario, all the NR component carriers (for example, PSCC and SCC(s)) may be in FR1. Thus, table 300 illustrates calculation of $CSSF_{outside\_gap,i}$ for FR1 PSCC, $CSSF_{outside\_gap,i}$ for FR1 SCC, and $CSSF_{outside\_gap,i}$ for inter-RAT NR measurement on SCCs. The CSSFs for the FR2 component carriers are not applicable for this scenario.

The $CSSF_{outside\_gap,i}$ for FR1 PSCC may be used to determine the measurement period for measurements on a PSCC in FR1. As shown, the UE 104 may calculate the $CSSF_{outside\_gap,i}$ for FR1 PSCC as '1' when only intra-frequency NR MO or only inter-RAT NR MO is configured on this PSCC. Thus, when one of the MOs is configured, but not both, the UE 104 may determine that the CSSF is '1' This may provide the full allocation of the PSCC searcher to the one MO.

The UE 104 may calculate the $CSSF_{outside\_gap,i}$ for FR1 PSCC as '2' when both intra-frequency NR MO and inter-RAT NR MO are configured on this PSCC. This may provide half allocation of the PSCC searcher to each of the MOs.

The $CSSF_{outside\_gap,i}$ for FR1 SCC may be used to determine the measurement period for measurements on SCCs in FR1. This CSSF may be for measurements corresponding to MOs configured by the SN gNB 112. As shown, the UE 104 may calculate the $CSSF_{outside\_gap,i}$ for FR1 SCC as a sum of a number of configured FR1 SCell(s) plus a number of inter-RAT NR measurement on SCCs. This may include all the MOs configured for NR SCCs, whether the MOs are configured by the SN gNB 112 or the MN eNB 108. In this manner, the $CSSF_{outside\_gap,i}$ for FR1 SCC may provide for the allocation of the SCC searcher to be shared among the MOs targeting SCCs as configured by both the SN gNB 112 and the MN eNB.

The $CSSF_{outside\_gap,i}$ for inter-RAT NR measurements on SCCs may be used to determine the measurement period for measurements on SCCs corresponding to the MOs configured by the MN eNB 108. As shown, the UE 104 may calculate the $CSSF_{outside\_gap,i}$ for inter-RAT NR measurements on SCCs as a sum of a number of configured FR1 SCell(s) plus a number of inter-RAT NR measurement on SCCs. Thus, the $CSSF_{outside\_gap,i}$ for inter-RAT NR measurements may be equal to the $CSSF_{outside\_gap,i}$ for FR1 SCC and may include all the MOs configured for NR SCCs, whether the MOs are configured by the SN gNB 112 or the MN eNB 108. In this manner, the $CSSF_{outside\_gap,i}$ for inter-RAT NR measurements on SCCs may provide for the allocation of the SCC searcher to be shared among the MOs targeting SCCs as configured by both the SN gNB 112 and the MN eNB.

FIG. 4 illustrates a table 400 describing CSSF calculations for another scenario in accordance with some embodiments. In this embodiment, the CSSF calculations may be for an EN-DC with FR2-only intra-band CA scenario. In this scenario, all the NR component carriers (for example, PSCC and SCC(s)) may be in the same band in FR2. Thus, table 410 illustrates calculation of $CSSF_{outside\_gap,i}$ for FR2 PSCC, $CSSF_{outside\_gap,i}$ for FR2 SCC where neighbor cell measurement is not required, and $CSSF_{outside\_gap,i}$ for inter-RAT NR measurement on SCCs. The CSSFs for FR1 are not applicable. Further, $CSSF_{outside\_gap,i}$ for FR2 SCC where neighbor cell measurement is required is not applicable because, in this scenario, the PSCell is in the same FR2 band as the SCell and, therefore, the full-capability SCC is not relevant. The full-capability SCC is discussed below with respect to table 500.

The $CSSF_{outside\_gap,i}$ for FR2 PSCC may be used to determine the measurement period for measurements on the PSCC that is in FR2. As shown, the UE 104 may calculate the $CSSF_{outside\_gap,i}$ for FR2 PSCC as '1' when only intra-frequency NR MO or only inter-RAT NR MO is configured on this PSCC. Thus, when one of the MOs is configured, but not both, the UE 104 may determine that the CSSF is '1' This may provide the full allocation of the PSCC searcher to the one MO.

The UE 104 may calculate the $CSSF_{outside\_gap,i}$ for FR2 PSCC as '2' when both intra-frequency NR MO and inter-RAT NR MO are configured on this PSCC. This may provide half allocation of the PSCC searcher to each of the MOs.

The $CSSF_{outside\_gap,i}$ for FR2 SCC where neighbor cell measurement is not required may be used to determine the measurement period for measurements on NR SCCs in FR2. This CSSF may be for measurements corresponding to MOs configured by the SN gNB 112. As shown, the UE 104 may calculate the $CSSF_{outside\_gap,i}$ for FR2 SCC where neighbor cell measurement is not required as a sum of a number of configured FR2 SCell(s) plus a number of inter-RAT NR measurement on SCCs. This may include all the MOs configured for NR SCCs, which will be in FR2, whether the MOs are configured by the SN gNB 112 or the MN eNB 108. In this manner, the $CSSF_{outside\_gap,i}$ for FR2 SCC where neighbor cell measurement is not required may provide for the allocation of the SCC searcher to be shared among the MOs targeting SCCs as configured by both the SN gNB 112 and the MN eNB.

The $CSSF_{outside\_gap,i}$ for inter-RAT NR measurements on SCCs may be used to determine the measurement period for measurements on SCCs corresponding to the MOs configured by the MN eNB 108. As shown, the UE 104 may calculate the $CSSF_{outside\_gap,i}$ for inter-RAT NR measurements on SCCs as a sum of a number of configured FR2 SCell(s) plus a number of inter-RAT NR measurement on SCCs. Thus, the $CSSF_{outside\_gap,i}$ for inter-RAT NR measurements may be equal to the $CSSF_{outside\_gap,i}$ for FR2 were neighbor cell measurement is not required and may include all the MOs configured for NR SCCs, whether the MOs are configured by the SN gNB 112 or the MN eNB 108. In this manner, the $CSSF_{outside\_gap,i}$ for inter-RAT NR measurements on SCCs may provide for the allocation of the SCC searcher to be shared among the MOs targeting SCCs as configured by both the SN gNB 112 and the MN eNB.

FIG. 5 illustrates a table 500 describing CSSF calculaments. In this embodiment, the CSSF calculations may be for an EN-DC with FR1 plus FR2 CA scenario. In this scenario, the NR PSCell may be in FR1 and the NR SCells may be in FR1 or FR2. Thus, table 400 illustrates calculation of $CSSF_{outside\_gap,i}$ for FR1 PSCC, $CSSF_{outside\_gap,i}$ for FR1 SCC, $CSSF_{outside\_gap,i}$ for FR2 SCC where neighbor cell measurement is required, $CSSF_{outside\_gap,i}$ for FR2 SCC where neighbor cell measurement is not required, and $CSSF_{outside\_gap,i}$ for inter-RAT NR measurement on SCCs. The CSSF for FR2 PSCC is not applicable.

The $CSSF_{outside\_gap,i}$ for FR1 PSCC is used and determined in a manner similar to that discussed above with respect to table 300.

The second measurement priority of this scenario may be with respect to the $CSSF_{outside\_gap,i}$ for FR2 SCC where neighbor cell measurement is required. In FR2, an SCC in which neighbor cell measurement is required may be referred to as a full-capability SCC. The full-capability SCC may be one of the SCCs on which the UE 104 may be configured to report SSB based measurements when neither the PCC nor the PSCC is in the same band. If the neighbor cell measurement is performed on the full-capability SCC, additional measurements in the same band as the full-capability SCC may not need to be measured. Thus, the full-capability SCC may be prioritized over other SCCs. In some embodiments, 50% of the SCC searcher may be dedicated to full-capability SCCs.

The UE 104 may calculate the $CSSF_{outside\_gap,i}$ for FR2 SCC where neighbor cell measurement is required as '2' when only the intra-frequency NR MO or only inter-RAT NR MO is configured on the SCC. Thus, when one MO is configured on a full-capability SCC, that MO may be provided 50% of the SCC searcher. The UE 104 may calculate the $CSSF_{outside\_gap,i}$ for FR2 SCC where neighbor cell measurement is required as '4' when both an intra-frequency NR MO and an inter-RAT NR MO are configured on the SCC. Thus, when two MOs are configured on the full-capability SCC, each MO may be provided 25% of the SCC searcher.

The remaining SCCs may have the third measurement priority in the scenario and may share the second half of the capabilities of the SCC searcher. The CSSFs corresponding to these SCCs include $CSSF_{outside\_gap,i}$ for FR1 SCC, the $CSSF_{outside\_gap,i}$ for FR2 SCC where neighbor cell measurement is not required, and the $CSSF_{outside\_gap,i}$ for inter-RAT NR measurements on SCCs.

The UE 104 may calculate $CSSF_{outside\_gap,i}$ for FR1 SCC as 2×(number of configured SCell(s)+number of inter-RAT NR measurement on SCCs-1) if $CSSF_{outside\_gap,i}$=2 for FR2 SCC where neighbor cell measurement is required. The value given by the expression (number of configured SCell(s)+number of inter-RAT NR measurement on SCCs) may include the total number of MOs configured for NR SCCs. This may include the MOs configured for the full-capability SCC. When $CSSF_{outside\_gap,i}$=2 for FR2 SCC where neighbor cell measurement is required, there is one MO configured for the full-capability SCC. Because the full-capability SCC is handled separately, this MO may be subtracted from the total number of MOs configured when determining $CSSF_{outside\_gap,i}$ for FR1 SCC. The expression (number of configured SCell(s)+number of inter-RAT NR measurement on SCCs-1) is multiplied by 2 because 50% of the SCC searcher is shared among the non-full capability SCCs.

The UE 104 may calculate $CSSF_{outside\_gap,i}$ for FR1 SCC as 2×(number of configured SCell(s)+number of inter-RAT NR measurement on SCCs-2) if $CSSF_{outside\_gap,i}$=4 for FR2 SCC where neighbor cell measurement is required. When $CSSF_{outside\_gap,i}$=4 for FR2 SCC where neighbor cell measurement is required, there are two MOs configured for the full-capability SCC, therefore, these two MOs may be subtracted from the total number of MOs configured when determining $CSSF_{outside\_gap,i}$ for FR1 SCC.

The $CSSF_{outside\_gap,i}$ for FR2 SCC where neighbor cell measurement is not required and the $CSSF_{outside\_gap,i}$ for inter-RAT NR measurements on SCCs may be calculated the same way in which the $CSSF_{outside\_gap,i}$ for FR1 SCC is calculated in this scenario as described above.

FIG. 6 illustrates a table 600 describing CSSF calculations for another scenario in accordance with some embodiments. In this embodiment, the CSSF calculations may be for an EN-DC with FR1 plus FR2 CA scenario. In this scenario, the NR PSCell may be in FR2 and the NR SCells may be in FR1 or FR2. Thus, table 600 illustrates calculation of $CSSF_{outside\_gap,i}$ for FR1 SCC, $CSSF_{outside\_gap,i}$ for FR1 PSCC, $CSSF_{outside\_gap,i}$ for FR2 SCC where neighbor cell measurement is not required, and $CSSF_{outside\_gap,i}$ for inter-RAT NR measurement on SCCs. The CSSF for FR1 PSCC is not applicable, nor is the $CSSF_{outside\_gap,i}$ for FR2 SCC where neighbor cell measurement is required (as the PSCell is in FR2).

The $CSSF_{outside\_gap,i}$ for FR2 PSCC may be calculated as shown above with respect to table 400. In particular, the $CSSF_{outside\_gap,i}$ for FR2 PSCC may be '1' when only intra-frequency NR MO or only inter-RAT NR MO is configured on this PSCC; and '2' when both intra-frequency NR MO and inter-RAT NR MO are configured on this PSCC. In this manner, the resources of the PSCC searcher may be divided between one or two MOs on the PSCC.

The resources of the SCC searcher may be divided between MOs on the NR SCCs, which may be configured by the MN eNB 108 or the SN gNB 112 in FR1 or FR2.

The UE 104 may calculate the $CSSF_{outside\_gap,i}$ for FR1 SCC, the $CSSF_{outside\_gap,i}$ for FR2 SCC where neighbor cell measurement is not required, and the $CSSF_{outside\_gap,i}$ for inter-RAT NR measurement on SCCs the same way. In particular, each of these CSSFs may be set equal to a sum of a number of configured SCell(s) plus a number of inter-RAT NR measurement on SCCs. The number of configured SCells in this scenario may include all the MOs configured for NR SCCs by the SN gNB 112, whether in FR1 or FR2. The number of inter-RAT NR measurements on SCCs may be for the MOs configured for NR SCCs by the MN eNB 108, which may also be in FR1 or FR2.

Figure 7:
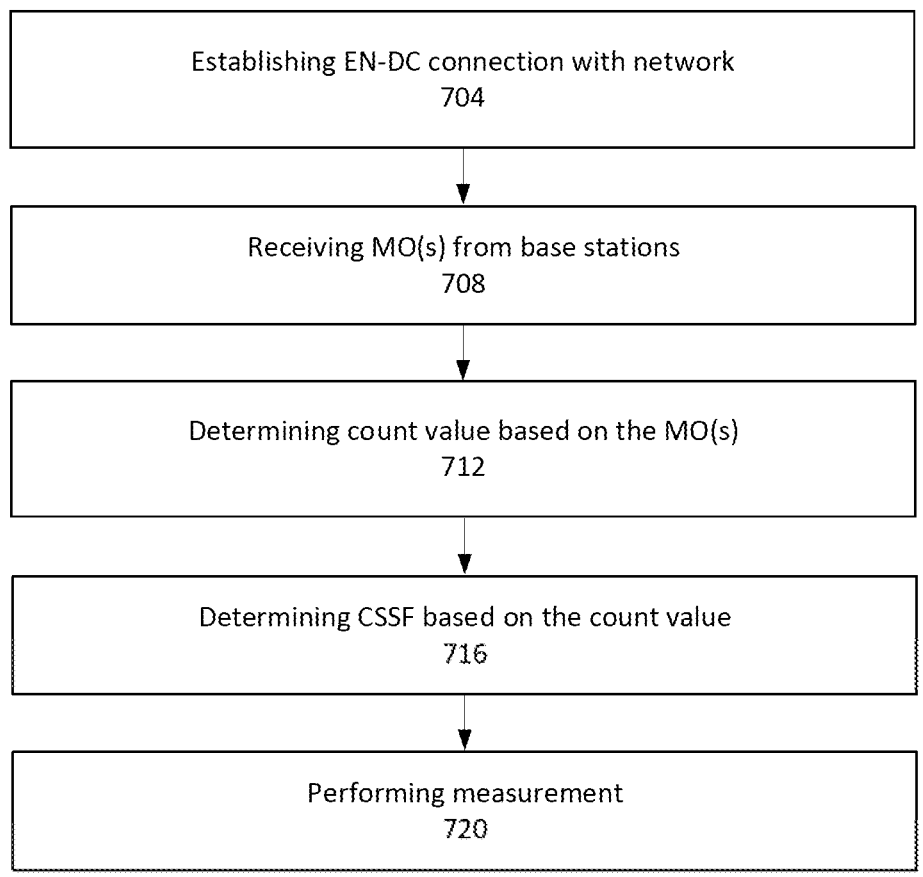
FIG. 7 illustrates an operational flow/algorithmic structure in accordance with some embodiments.

FIG. 7 illustrates an operation flow/algorithmic structure 700 in accordance with some embodiments. The operation flow/algorithmic structure 700 may be performed or implemented by a UE such as, for example, UE 104 or UE 1000; or components thereof, for example, baseband processor 1004A.

The operation flow/algorithmic structure 700 may include, at 704, establishing an EN-DC connection with a network. The EN-DC connection may be established by connecting with an MN eNB and an SN gNB as described above with respect to network environment 100.

The operation flow/algorithmic structure 700 may further include, at 708, receiving one or more MOs from the base stations. The MOs may configure measurements in NR cells provided by the SN gNB including, for example, an NR PSCell and one or more NR SCells. The NR cells may be in FR1 or FR2. The MOs may include inter-RAT MOs provided to the UE 104 by the MN eNB and intra-RAT MOs provided to the UE 104 by the SN gNB. The intra-RAT MOs may include inter-frequency MOs and intra-frequency MOs.

The operation flow/algorithmic structure 700 may further include, at 712, determining a count value based on the MOs. The count value may be determined based on a number of MOs configured for the PSCCs and SCCs as described above with respect to the scenarios and CSSFs described in tables 300-600.

The operation flow/algorithmic structure 700 may further include, at 716, determining a CSSF based on the count value. As described herein, a CSSF may be determined for the PSCC and one more CSSFs may be determined for SCCs. For example, in some embodiments separate CSSFs may be determined for measurements based on SCC MOs configured by the MN and the SN; or measurements for FR1 and FR2 SCCs. Further, in some instances, separate CSSFs may be determined for FR2 SCCs when, for example, a full-capability SCC is configured.

The operation flow/algorithmic structure 700 may further include, at 720, performing a measurement. The measurement may be performed outside a measurement gap as configured by the MOs received at 708. The measurement may be performed within a measurement period determined by the CSSFs at 716. In some embodiments, the measurements may be performed by two searchers of the UE, one dedicated to the PSCC and one shared among the SCCs. The CSSFs determined at 716 may facilitate the distribution of the resources of the searchers by providing a longer measurement period when additional measurements need to be performed.

In calculating the CSSFs of tables 300-600, the inter-RAT MO and intra-frequency MOs on the same serving carriers were counted independently without reference to the MO merging rule. In other embodiments, for example, as introduced with respect to the second option above, whether these MOs are to be counted independently may be based on whether the MO merging rule is met.

For example, in some EN DC embodiments, the CSSF scaling factor outside measurement gap may independently count and inter-RAT MO configured from the LTE PCell (for example, by the MN eNB 108) and intra-frequency MO configured from NR PSCell only if they are on different frequency layers; or they are on the same frequency layer but do not meet the MO merging criteria.

To accommodate these embodiments, the fields of tables 300-600 may include an additional condition that: when one intra-frequency MO configured from NR PSCell and one inter-RAT MO configured from LTE PCell are on the same frequency layer and they fulfill the MO merging criteria, they are only counted one time for CSSF calculations/accumulation; otherwise, if they are not on different layers or they cannot meet MO merging criteria, they are counted as two for CSSF calculation/accumulation.

Consider, for example, the scenario of table 300. If the MN eNB 108 provides the UE 104 with an inter-RAT MO for an FR1 PSCC and the SN gNB 112 provides the UE 104 with an intra-frequency MO for the FR1 PSCC, the UE 104 may determine whether to calculate the $CSSF_{outside\_gap,i}$ for FR1 PSCC as '1' or '2' as follows. The UE 104 may determine that the two MOs are to be counted as one unless they have different RSSI measurement resources, different deriveSSB-IndexFromCell indications, or different SMTC configurations. If any of these parameters are different, the MOs may be considered to not meet the MO merging criteria and may be counted as two.

In some embodiments, even if the two MOs do not meet the MO merging criteria, they may still be merged if the meet additional criteria.

For example, the CSSF scaling factor outside measurement gap may independently count the inter-RAT MO configured from LTE PCell (for example, by MN eNB 108) and intra-frequency MO configured from NR PSCell (for example, by SN gNB 112) if any of the following conditions are met: they are on different frequency layers; or they are on the same frequency layer but they cannot meet MO merging criteria, only except the following cases: if SMTC configured from LTE PCell is fully non-overlapped with SMTC configured from NR PSCell on the same frequency layer (while deriveSSB-IndexFromCell indication from the two MOs are the same and the RSSI measurement resources are the same or are fully non-overlapped (for example, TDMed as discussed below)), the two MOs may be counted one time for CSSF; and if RSSI measurement resources from LTE MN is TDMed on symbol level with RSSI measurement resources from NR SN (while deriveSSB-IndexFromCell indication from the two MOs are the same and the SMTC configurations are either the same or are fully non-overlapped), then the two MOs may be counted one time for CSSF.

Figure 8:
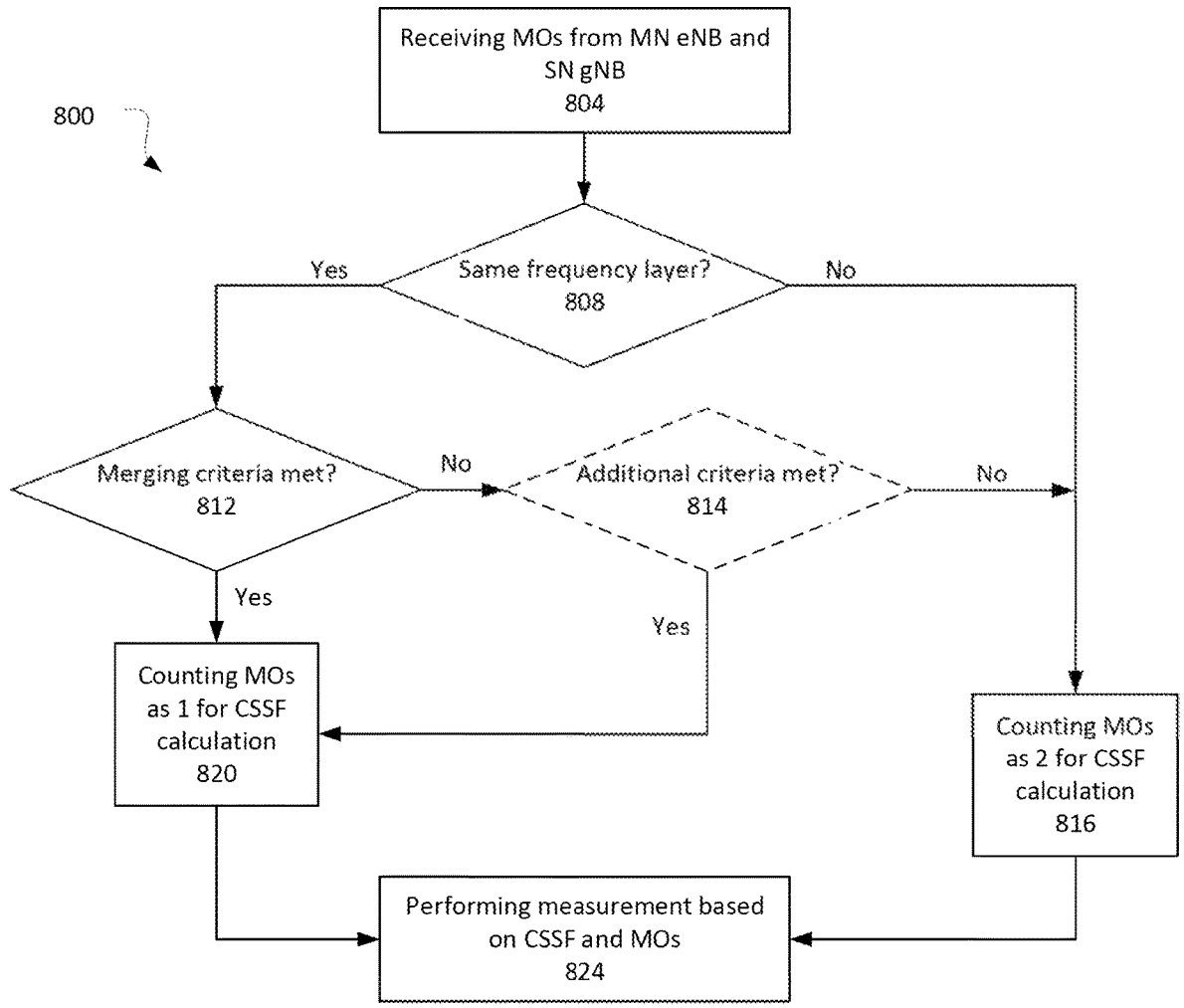
FIG. 8 illustrates another operational flow/algorithmic structure in accordance with some embodiments.

FIG. 8 illustrates an operation flow/algorithmic structure 800 in accordance with some embodiments. The operation flow/algorithmic structure 800 may be performed or implemented by a UE such as, for example, UE 104 or UE 1000; or components thereof, for example, baseband processor 1004A.

The operation flow/algorithmic structure 800 may include, at 804, receiving MOs from MN eNB and SN gNB. The MOs may configure measurements on one or more cells provided by the SN gNB. The MOs may include inter-RAT MOs from the MN eNB or intra-RAT MOs from the SN gNB.

The operation flow/algorithmic structure 800 may further include, at 808, determining whether the MOs are on the same frequency layer. For example, the UE may determine whether more than one MO targets the same component carrier, which may be a PSCC or an SCC provided by the SN gNB.

If it is determined, at 808, that the two MOs do not target the same frequency layer, the operation flow/algorithmic structure 800 may advance to counting the two MOs as two for a CSSF calculation at 816.

Following 816, the operation flow/algorithmic structure 800 may advance to performing measurements based on the CSSF and MOs. The measurements may be performed as described with respect to operation 720 of FIG. 7 or elsewhere herein.

If it is determined, at 808, that the two MOs target the same frequency layer, the operation flow/algorithmic structure 800 may advance to determining whether merging criteria are met at 812. Determining whether the merging criteria are met may include comparing designated parameters from the first MO to designated parameters of the second MO. The designated parameters may include RSSI measurement resources, derivedSSB-IndexFromCell indications, and SMTC configurations.

If one or more of the designated parameters from the two MOs are different, the merging criteria may not be met and the operation flow/algorithmic structure 800 may advance to determining whether additional criteria are met at 814. The additional criteria determination, which may be optional in some embodiments as indicated by the dashed line, may include a closer examination of the different parameters that caused the merging criteria to not be met.

Consider, for example, that the merging criteria were not met because the first MO included a first SMTC that was different from a second SMTC of the second MO. If these SMTCs are fully non-overlapped, it may not be necessary to count these MOs independently for CSSF determination. For example, consider that each SMTC was 14 ms and they were offset from one another by 20 ms. The UE may do the measurements in a TDM manner without having to share resources on the frequency or baseband. While the two measurements may take some additional time, for example, 20 ms, it is not necessary to double the measurement period.

In another example, if the merging criteria were not met because the RSSI measurement resources differ between the two MOs, the two MOs may still be combinable for CSSF purposes if the RSSI measurement resources indicated by the first MO are TDMed on a symbol level with the RSSI measurement resources indicated by the second MO. In a manner similar to the different SMTC configurations discussed above, the measurement period may not need to be scaled by two in order to accommodate the measurements of the two MOs in this instance.

Thus, if either of these additional criteria are considered to be met at 814, the operation flow/algorithmic structure 800 may advance to counting the MOs as one for CSSF calculation at 820.

If it is determined that these additional criteria are not met at 814, the operation flow/algorithmic structure 800 may advance to counting the MOs as two for CSSF calculation at 816.

In some embodiments, the merging criteria discussed at 812 may be considered first-stage merging criteria, while the additional criteria discussed at 814 may be considered second-stage merging criteria.

In the event the additional (or second-stage merging) criteria are not present, and the merging criteria is determined not met at 812, the operation flow/algorithmic function 800 may advance to counting the two MOs as two for CSSF calculation at 816.

If, at 812, all the designated parameters from the two MOs are the same, the merging criteria may be met and the operation flow/algorithmic structure 800 may advance to counting the MOs as one for the CSSF calculation at 820.

Following 820, the operation flow/algorithmic structure 800 may advance to performing measurements based on the CSSF and MOs at 824.

In a third option, as briefly introduced above, the CSSF design may be simplified by configuration on the network side. For example, in EN DC, the network may communicate between the LTE PCell (for example, the MN eNB 108) and the NR PSCell (for example, the SN gNB 112) to avoid MO configuration on the same frequency layer. In this situation, to calculate the CSSF scaling factor outside measurement gap, the UE 104 may always independently count the inter-RAT MO configured from the LTE PCell and the intra-frequency MO configured from the NR PSCell. The UE 104 may consider it an error case if these two MOs are received on the same frequency layer.

In some embodiments, the network may communicate between the LTE PCell and the NR PSCell to assure that the LTE PCell will not configure the inter-RAT NR measurement. In these embodiments, only the NR PSCell may configure the NR measurement by, for example, providing an intra-frequency NR MO. The UE may then determine that CSSF scaling factor outside measurement gap by only counting the intra-frequency NR MO configured from the NR PSCell.

In some embodiments, the network may communicate between the LTE PCell and the NR PSCell to assure that the LTE PCell will configure the inter-RAT NR measurement. In these embodiments, the NR PSCell will not configure the intra-frequency NR measurement. The UE may then determine that CSSF scaling factor outside measurement gap by only counting the inter-RAT NR MO configured from the LTE PCell.

Figure 9:
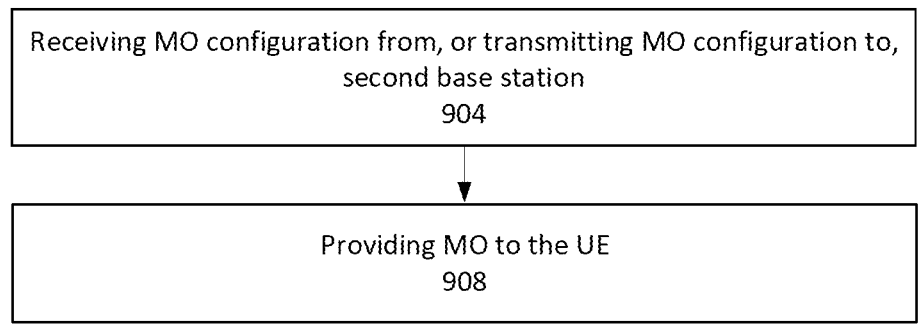
FIG. 9 illustrates another operational flow/algorithmic structure in accordance with some embodiments.

FIG. 9 illustrates an operation flow/algorithmic structure 900 in accordance with some embodiments. The operation flow/algorithmic structure 900 may be performed or implemented by a first base station such as, for example, MN eNB 108, SN gNB 112, or base station 1100; or components thereof, for example, baseband processor 1104A.

The operation flow/algorithmic structure 900 may include, at 904, receiving an MO configuration from, or transmitting the MO configuration to, second base station. The MO configuration may be transmitted from an MN to an SN or from an SN to the MN via an X2 interface. The MO configuration may restrict provision of a plurality of MOs to the UE for one frequency layer of the NR cell. For example, the MO configuration may prevent the network from transmitting both an inter-RAT MO from an MN eNB and an intra-frequency MO from an SN gNB that target the same frequency layer.

In some embodiments, the MO configuration may restrict provision of the plurality of MOs to either: one MO; or two MOs that satisfy the merging criteria. For example, the MO configuration may allow the network to configure the two MOs only on the condition that they satisfy the merging criteria and can, therefore, be counted as one for the CSSF calculation.

The operation flow/algorithmic structure 900 may further include, at 908, providing an MO to the UE. In embodiments in which the first base station is an MN eNB, the MO provided to the UE may be an inter-RAT MO for the NR frequency layer. In embodiments in which the first base station is an SN gNB, the MO provided to the UE may be an intra-frequency MO for the NR frequency layer.

Figure 10:
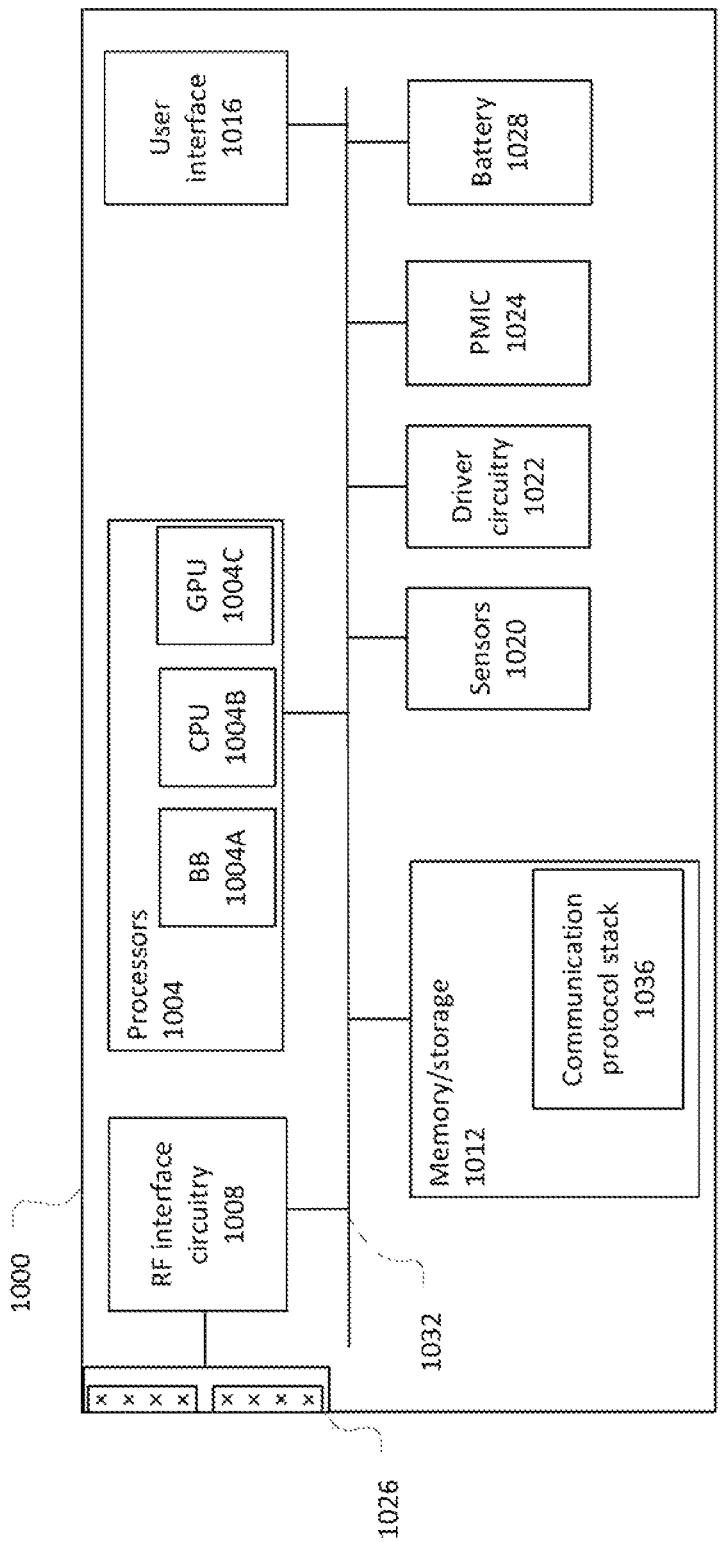
FIG. 10 illustrates a user equipment in accordance with some embodiments.
Figure 11:
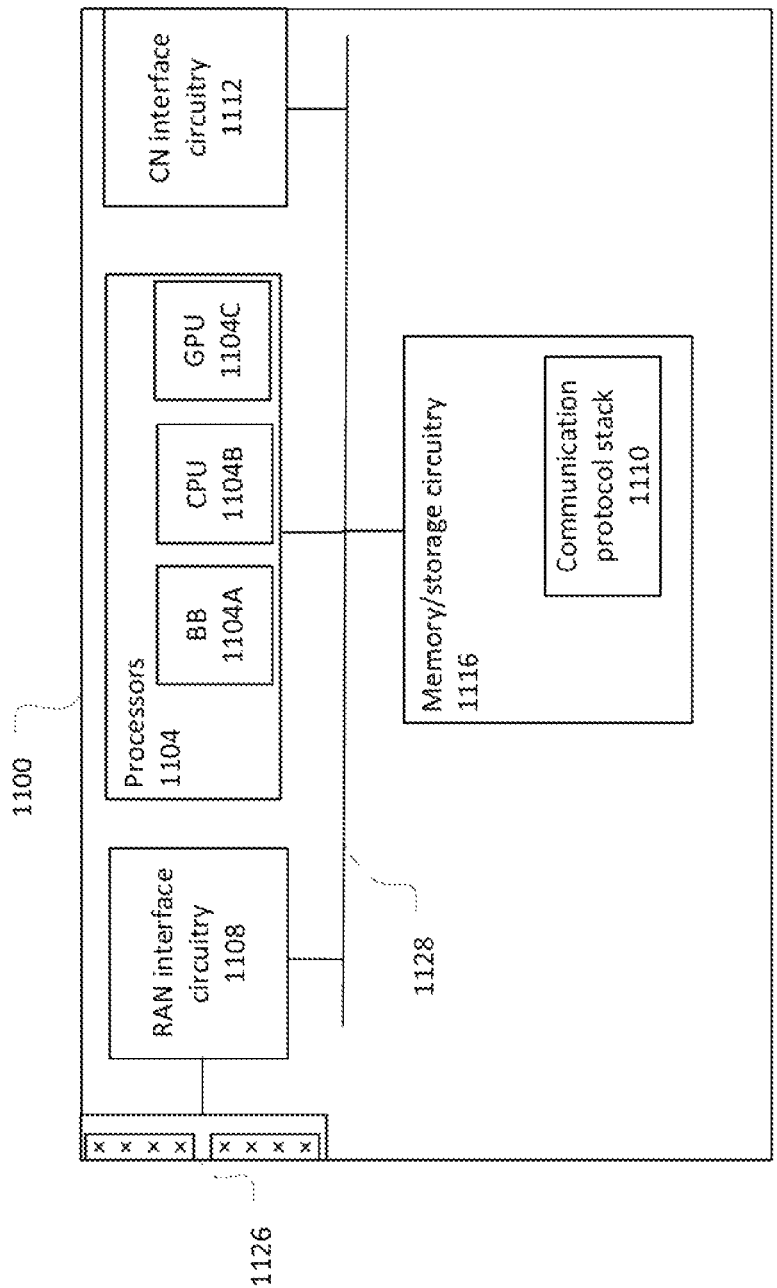
FIG. 11 illustrates a base station in accordance with some embodiments.

FIG. 10 illustrates a UE 10M in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM). Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers: microphones or other like audio capture devices; etc.

The driver circuitry 1022 may include software and hardware elements that operate to control particular devices that are embedded in the UE 1000, attached to the UE 1100, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

FIG. 1I illustrates a gNB 1100 in accordance with some embodiments. The gNB node 1100 may similar to and substantially interchangeable with base station 108 of FIG. 1.

The gNB 1100 may include processors 1104, RF interface circuitry 1108, core network "CN" interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the gNB 1100 may be coupled with TRPs, such as TRPs 112 or 116, using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a UE, the method comprising: establishing a dual connectivity communication session with a master node (MN) evolved node B (eNB) and a secondary node (SN) gNB; receiving, from the MN eNB or the SN gNB, one or more measurement objects (MOs) to configure a measurement outside a measurement gap in a primary secondary cell component carrier (PSCC) provided by the SN gNB, wherein the one or more MOs include an inter-radio access technology (RAT) new radio (NR) management object (MO) or an intra-frequency NR MO: determining a count value equal to one or two based on the one or more MOs; and determining a carrier specific scaling factor (CSSF) for the PSCC based on the count value.

Example 2 may include the method of example 1 or some other example herein, further comprising scaling a measurement period for the measurement outside the measurement gap based on the CSSF.

Example 3 may include the method of example 1 or some other example herein, wherein the PSCC is in frequency range 1 (FR1) or frequency range 2 (FR2).

Example 4 may include the method of example 3 or some other example herein, wherein determining the count value comprises: determining the count value is equal to one when only an intra-frequency NR MO or only inter-RAT NR MO is configured on the PSCC; and determining the count value is equal to two when both intra-frequency NR MO and inter-RAT NR MO are configured on the PSCC.

Example 5 may include the method of example 4 some other example herein, wherein the method further comprises: performing, with a first searcher, the measurement in the PSCC based on the CSSF for the PSCC; and performing, with a second searcher, measurements in one or more secondary component carriers (SCCs) based on a CSSF for the SCCs.

Example 6 may include the method of example 4 or some other example herein, wherein the method further comprises: determining a CSSF for one or more secondary component carriers (SCCs) is equal to a number of configured secondary cells plus a number of inter-RAT NR measurements on the one or more SCCs.

Example 7 may include the method of example 4 some other example herein, further comprising: determining a CSSF for inter-RAT NR measurement on one or more secondary component carriers (SCCs) is equal to a number of configured secondary cells plus a number of inter-RAT NR measurements on the one or more SCCs.

Example 8 may include the method of example 4 or some other example herein, when the method further comprises: determining a CSSF for an FR2 SCC in which neighbor cell measurement is required is equal to two if the FR2 SCC is only configured with an intra-frequency NR MO or only an inter-RAT NR MO and is equal to four if the FR2 SCC is configured with both an intra-frequency NR MO and an inter-RAT NR MO.

Example 9 may include the method of example 8 or some other example herein, wherein the method further comprises: determining a CSSF for an FR1 SCC is equal to: 2×(a number of configured secondary cells+a number of inter-RAT NR measurement on all SCCs−1) if the CSSF for the FR2 SCC in which neighbor cell measurement is required is two; or 2×(a number of configured secondary cells+a number of inter-RAT NR measurement on all SCCs−2) if the CSSF for the FR2 SCC in which neighbor cell measurement is required is four.

Example 10 may include the method of example 3 or some other example herein, wherein the dual connectivity communication session comprises evolved universal terrestrial access—new radio dual connectivity (EN-DC) with: FR1-only carrier aggregation (CA); FR2-only intra-band CA; FR1 and FR2 CA with the PSCC in FR1; or FR1 and FR2 CA with the PSCC in FR2.

Example 11 includes a method of operating a UE, the method comprising storing merging criteria; receiving a first measurement object (MO) from a master node (MN) evolved node B (eNB) to configure a measurement on a primary secondary component carrier (PSCC); receiving a second MO from a secondary node (SN) gNB to configure a measurement on the PSCC; calculating a carrier-specific scaling factor (CSSF) for the PSCC based on whether the first MO and the second MO satisfy the merging criteria; and performing one or more measurements on the PSCC based on the CSSF.

Example 12 may include the method of example 11 or some other example herein, further comprising: determining that the first MO and the second MO identify common RSSI measurement resources, deriveSSB-lndexFromCell indications; and SMTC configurations; determining that the first MO and the second MO satisfy the merging criteria based on said determination that the first MO and the second MO identify common RSSI measurement resources, deriveSSB-IndexFromCell indications; and SMTC configurations; and calculating the CSSF for the PSCC as one based on the determination that the first MO and the second MO satisfy the merging criteria.

Example 13 may include the method of example 11 or some other example herein, further comprising: determining that the first MO and the second MO identify different RSSI measurement resources, deriveSSB-IndexFromCell indications; or SMTC configurations; determining that the first MO and the second MO do not satisfy the merging criteria based on said determination that the first MO and the second MO identify different RSSI measurement resources, deriveSSB-IndexFromCell indications; or SMTC configurations; and calculating the CSSF for the PSCC as two based on the determination that the first MO and the second MO do not satisfy the merging criteria.

Example 14 may include the method of example 13 or some other example herein, further comprising: determining that the first MO and the second MO identify different RSSI measurement resources, deriveSSB-IndexFromCell indications, or SMTC configurations; determining that the first MO and the second MO do not satisfy the merging criteria based on said determination that the first MO and the second MO identify different RSSI measurement resources, deriveSSB-indexFromCell indications, or SMTC configurations; determining whether the first MO and the second MO satisfy additional criteria based on the determination that the first MO and the second MO do not satisfy the merging criteria; and calculate the CSSF based on the determination of whether the first MO and the second MO satisfy the additional criteria.

Example 15 may include the method of example 14 or some other example herein, wherein the first MO includes a first SMTC configuration, the second MO includes a second SMTC configuration that is different from the first SMTC configuration, and the method further comprises: determining that the first MO in the second MO satisfy the additional criteria based on a determination that the first SMTC configuration is fully non-overlapped with the second SMTC configuration; and calculating the CSSF for the PSCC as one based on the determination that the first MO and the second MO satisfy the additional criteria.

Example 16 may include the method of example 15 or some other example herein, wherein the first MO and the second MO include identical deriveSSB-IndexFromCell indications.

Example 17 may include the method of example 14 or some other example herein, wherein the first MO indicates first received signal strength indicator (RSSI) measurement resources, the second MO indicates second RSSI measurement resources that are different from the first RSSI measurement resources, and the method further comprises: determining that the first MO and the second MO satisfy the additional criteria based on a determination that the first RSSI measurement resources are time division multiplexed (TDMed) on a symbol level with the second RSSI measurement resources; and calculating the CSSF for the PSCC as one based on the determination that the first MO and the second MO satisfy the additional criteria.

Example 18 may include the method of example 17 or some other example herein, wherein the first MO and the second MO include identical deriveSSB-indexFromCell indications and SMTC configurations.

Example 19 may include a method of operating a first base station, the method comprising: receiving from a measurement object configuration from, or transmitting the measurement object configuration to, a second base station, wherein the first and second base station provide a user equipment (UE) with an evolved universal terrestrial radio access—new radio dual connectivity (EN-DC) connection, the measurement object configuration to restrict provision of a plurality of measurement object (MOs) to the UE for one frequency layer of a new radio (NR) cell or to restrict provision of the plurality of MOs to the UE; and providing a MO to the UE to configure the UE to perform a measurement outside of a measurement gap on the frequency layer.

Example 20 may include the method of example 19 or some other example herein, wherein: the first base station is a master node (MN) eNB, the second base station is a secondary node (SN) gNB, the measurement object configuration is to prevent provision of an intra-frequency NR MO from the SN gNB, and the MO is an inter-RAT NR MO.

Example 21 may include the method of example 19 or some other example herein, wherein: the first base station is a secondary node (SN) gNB, the second base station is a master node (MN) eNB, the measurement object configuration is to prevent provision of an inter-radio access technology (RAT) NR MO from the MN eNB, and the MO is an intra-frequency NR MO.

Example 22 may include the method of claim 19 or some other example herein, wherein the measurement object configuration is to restrict provision of a plurality of MOs to the UE for the one frequency layer to either one MO or to two MOs that satisfy a merging criteria.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a datagram, information element, packet, frame, segment, PDU, or message as described in or related to any of examples 1-22, or portions or parts thereof, or otherwise described in the present disclosure.

Example 30 may include a signal encoded with data as described in or related to any of examples 1-22, or portions or parts thereof, or otherwise described in the present disclosure.

Example 31 may include a signal encoded with a datagram, IE, packet, frame, segment. PDU, or message as described in or related to any of examples 1-22, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 33 may include a computer program comprising instructions, wherein execution of the program by a processing element is to cause the processing element to carry out the method, techniques, or process as described in or related to any of examples 1-22, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
    establish a dual connectivity communication session with a master node (MN) evolved node B (eNB) and a secondary node (SN) gNB;
    process one or more measurement objects (MOs) received from the MN eNB or the SN gNB, the one or more MOs to configure a measurement outside a measurement gap in a primary secondary cell component carrier (PSCC) provided by the SN gNB, wherein the one or more MOs include an inter-radio access technology (RAT) new radio (NR) management object (MO) or an intra-frequency NR MO;
    determine a count value equal to one or two based on the one or more MOs; and
    determine a carrier specific scaling factor (CS SF) for the PSCC based on the count value.

2. The one or more non-transitory computer-readable media of claim 1, wherein the instructions are further to cause the processing circuitry to:
    scale a measurement period for the measurement outside the measurement gap based on the CSSF.

3. The one or more non-transitory computer-readable media of claim 1, wherein the PSCC is in frequency range 1 (FR1) or frequency range 2 (FR2).

4. The one or more non-transitory computer-readable media of claim 3, wherein to determine the count value comprises:
    determine the count value is equal to one when only an intra-frequency NR MO or only inter-RAT NR MO is configured on the PSCC; and
    determine the count value is equal to two when both intra-frequency NR MO and inter-RAT NR MO are configured on the PSCC.

5. The one or more non-transitory computer-readable media of claim 4, wherein the instructions, when executed, further cause the processing circuitry to:
    perform, with a first searcher, the measurement in the PSCC based on the CSSF for the PSCC; and
    perform, with a second searcher, measurements in one or more secondary component carriers (SCCs) based on a CSSF for the SCCs.

6. The one or more non-transitory computer-readable media of claim 4, wherein the instructions, when executed, further cause the processing circuitry to:
    determine a CSSF for one or more secondary component carriers (SCCs) is equal to a number of configured secondary cells plus a number of inter-RAT NR measurements on the one or more SCCs.

7. The one or more non-transitory computer-readable media of claim 4, wherein the instructions, when executed, further cause the processing circuitry to:
    determine a CSSF for inter-RAT NR measurement on one or more secondary component carriers (SCCs) is equal to a number of configured secondary cells plus a number of inter-RAT NR measurements on the one or more SCCs.

8. The one or more non-transitory computer-readable media of claim 4, wherein the instructions, when executed, further cause the processing circuitry to:
determine a CSSF for an FR2 SCC in which neighbor cell measurement is required is equal to two if the FR2 SCC is only configured with an intra-frequency NR MO or only an inter-RAT NR MO and is equal to four if the FR2 SCC is configured with both an intra-frequency NR MO and an inter-RAT NR MO.

9. The one or more non-transitory computer-readable media of claim 8, wherein the instructions, when executed further cause the processing circuitry to:
determine a CSSF for an FR1 SCC is equal to: 2×(a number of configured secondary cells+a number of inter-RAT NR measurement on all SCCs−1) if the CSSF for the FR 2 SCC in which neighbor cell measurement is required is two; or 2×(a number of configured secondary cells+a number of inter-RAT NR measurement on all SCCs−2) if the CSSF for the FR 2 SCC in which neighbor cell measurement is required is four.

10. The one or more non-transitory computer-readable media of claim 3, wherein the dual connectivity communication session comprises evolved universal terrestrial access—new radio dual connectivity (EN-DC) with: FR1-only carrier aggregation (CA); FR2-only intra-band CA; FR1 and FR2 CA with the PSCC in FR1; or FR1 and FR2 CA with the PSCC in FR2.

11. A processor comprising:
memory to store merging criteria; and
processing circuitry coupled with the memory, the processing circuitry to:
process a first measurement object (MO) received from a master node (MN) evolved node B (eNB) to configure a measurement on a serving carrier;
process a second MO received from a secondary node (SN) gNB to configure a measurement on the serving carrier;
calculate a carrier-specific scaling factor (CSSF) based on whether the first MO and the second MO satisfy the merging criteria; and
determine a measurement period based on the CSSF.

12. The processor of claim 11, wherein the processing circuitry is further to:
determine that the first MO and the second MO identify common received signal strength indicator (RSSI) measurement resources, derive-synchronization signal block (SSB)-index-from-cell (deriveSSB-IndexFromCell) indications; and SSB-based measurement timing configurations (SMTC);
determine that the first MO and the second MO satisfy the merging criteria based on said determination that the first MO and the second MO identify common RSSI measurement resources, deriveSSB-IndexFromCell indications; and SMTC configurations; and
calculate the CSSF as one based on the determination that the first MO and the second MO satisfy the merging criteria.

13. The processor of claim 11, wherein the processing circuitry is further to:
determine that the first MO and the second MO identify different received signal strength indicator (RSSI) measurement resources, derive-synchronization signal block (SSB)-index-from-cell (deriveSSB-IndexFromCell) indications; or SSB-based measurement timing configurations (SMTCs);
determine that the first MO and the second MO do not satisfy the merging criteria based on said determination that the first MO and the second MO identify different RSSI measurement resources, deriveSSB-IndexFromCell indications; or SMTCs; and
calculate the CSSF as two based on the determination that the first MO and the second MO do not satisfy the merging criteria.

14. The processor of claim 13, wherein the processing circuitry is further to:
determine that the first MO and the second MO identify different RSSI measurement resources, deriveSSB-IndexFromCell indications, or SMTCs;
determine that the first MO and the second MO do not satisfy the merging criteria based on said determination that the first MO and the second MO identify different RSSI measurement resources, deriveSSB-IndexFromCell indications, or SMTCs;
determine whether the first MO and the second MO satisfy additional criteria based on the determination that the first MO and the second MO do not satisfy the merging criteria; and
calculate the CSSF based on the determination of whether the first MO and the second MO satisfy the additional criteria.

15. The processor of claim 14, wherein the first MO includes a first SMTC, the second MO includes a second SMTC that is different from the first SMTC, and the processing circuitry is further to:
determine that the first MO in the second MO satisfy the additional criteria based on a determination that the first SMTC is fully non-overlapped with the second SMTC; and
calculate the CSSF as one based on the determination that the first MO and the second MO satisfy the additional criteria.

16. The processor of claim 15, wherein the first MO and the second MO include identical deriveSSB-IndexFromCell indications.

17. The processor of claim 14, wherein the first MO indicates first received signal strength indicator (RSSI) measurement resources, the second MO indicates second RSSI measurement resources that are different from the first RSSI measurement resources, and the processing circuitry is further to:
determine that the first MO and the second MO satisfy the additional criteria based on a determination that the first RSSI measurement resources are time division multiplexed (TDMed) on a symbol level with the second RSSI measurement resources; and
calculate the CSSF as one based on the determination that the first MO and the second MO satisfy the additional criteria.

18. The processor of claim 17, wherein the first MO and the second MO include identical deriveSSB-IndexFromCell indications and SMTCs.

19. A method of operating a first base station, the method comprising:
receiving from a measurement object configuration from, or transmitting the measurement object configuration to, a second base station, wherein the first and second base station provide a user equipment (UE) with an evolved universal terrestrial radio access—new radio dual connectivity (EN-DC) connection, the measurement object configuration to restrict provision of a plurality of measurement object (MOs) to the UE for one frequency layer of a new radio (NR) cell or to restrict provision of the plurality of MOs to the UE; and providing a MO to the UE to configure the UE to perform a measurement outside of a measurement gap on the frequency layer.

20. The method of claim 19, wherein: the first base station is a master node (MN) eNB, the second base station is a secondary node (SN) gNB, the measurement object configuration is to prevent provision of an intra-frequency NR MO from the SN gNB, and the MO is an inter-RAT NR MO.

21. A method comprising:

processing a first measurement object (MO) received from a master node (MN) evolved node B (eNB) to configure a measurement on a serving carrier;

processing a second MO received from a secondary node (SN) gNB to configure a measurement on the serving carrier;

calculating a carrier-specific scaling factor (CSSF) based on whether the first MO and the second MO satisfy a merging criteria; and determining a measurement period based on the CSSF.

22. The method of claim 21, further comprising:

determining that the first MO and the second MO identify common received signal strength indicator (RSSI) measurement resources, derive-synchronization signal block (SSB)-index-from-cell (deriveSSB-IndexFromCell) indications; and SSB-based measurement timing configurations (SMTCs);

determining that the first MO and the second MO satisfy the merging criteria based on said determination that the first MO and the second MO identify common RSSI measurement resources, deriveSSB-IndexFromCell indications; and SMTCs; and calculating the CSSF as one based on the determination that the first MO and the second MO satisfy the merging criteria.

\* \* \* \* \*

UNITED STATES PATENT AND TRADEMARK OFFICE
CERTIFICATE OF CORRECTION

PATENT NO. : 12,167,261 B2  
APPLICATION NO. : 17/442557  
DATED : December 10, 2024  
INVENTOR(S) : Jie Cui et al.

Page 1 of 1

It is certified that error appears in the above-identified patent and that said Letters Patent is hereby corrected as shown below:

On the Title Page

Item (72) Inventors: please delete "Jie Cui, San Jose (CA)" and insert --Jie Cui, San Jose, CA (US)--

Signed and Sealed this  
Fourth Day of February, 2025

Coke Morgan Stewart  
*Acting Director of the United States Patent and Trademark Office*